United States Patent Office 3,575,838
Patented Apr. 20, 1971

3,575,838
ELECTROPHORETIC DEPOSITION OF CERAMIC COATINGS
Ernest W. Hughes, Lakewood, Ohio, assignor to Ferro Corporation, Cleveland, Ohio
No Drawing. Filed Dec. 12, 1968, Ser. No. 783,418
Int. Cl. B01k 5/00; C23b 13/00
U.S. Cl. 204—181                          20 Claims

ABSTRACT OF THE DISCLOSURE

In the method of electrophoretically depositing a ceramic coating from a supply of slip thereof, the improvement step of incorporating in the tank batch, a combination of an alkali aluminate, and an alkali salt selected from the group consisting of alkali silicates, alkali zirconates and alkali titanates.

BACKGROUND OF THE INVENTION

The electrophoretic ceramic coating method is superior to conventional dipping or spraying techniques as it is rapid, and effectively coats all surfaces of a workpiece, including its edges.

The broad field of the use of electrophoresis for the deposition of a ceramic frit, adaptable to be fired to a fused vitreous coating, on a suitable substrate, has been known for some time, and the process is generally disclosed by U.S. Pats. 1,907,984 to Kraner, 2,321,439 to Verwey et al., 2,478,322 to Robinson et al., and 2,826,541 to Barr et al. The foregoing generally disclosing the electrodeposition of inorganic coatings such as vitreous frits and/or cermets to suitable substrates.

See also published article by the inventor hereof entitled "Now: Electrodeposition for Porcelain Enamel" published in Metal Products Manufacturing Magazine, Dana Chase Publications Inc., copyright August 1968.

However, until extensive investigative work was conducted by this inventor, the commercial use of electrodeposition had not been considered commercially feasible, particularly in view of recent industrial progress characterized by continuous, automated production lines.

That is, electrophoresis previously had a fundamental drawback which militated against its use in a continuous ceramic coating operation. Depending upon the shape of the substrate to be coated, as well as its position, and distance, from the electrode of opposite polarity, certain parts of the item would be more rapidly and heavily coated than others, resulting in a commercially unacceptable, non-uniform coating exhibiting areas which were completely uncoated, certain areas coated so thinly that in the ultimate firing operation the coating was partially burned off, and areas of excessively heavy coating characterized by crawling and tearing.

By virtue of the invention hereinafter disclosed and claimed, the process of electrophoresis as applied to inorganic coatings such as ceramics and cermets, for the first time, has been improved and revised whereby, as the coating is electrophoretically deposited on a substrate, it develops a self-limiting characteristic as a result of the deposited coating losing its conductance in direct proportion to its thickness at any given point, thus retarding the rate of deposition in those areas which rapidly become fully coated, enabling other, less readily accessible areas to "catch up" with the heavier areas, thus providing a means for achieving a uniform coating on the most complex shapes, in a relatively short period of time.

Accordingly, it is the principal object of this invention to provide an improved electrophoretic process, and resulting article, whereby a uniform ceramic or cermet coating may be achieved by electrophoresis on all surfaces of a substrate, irrespective of the shape of the substrate.

DESCRIPTION OF THE INVENTION

Although certain refinements have been introduced, the equipment for practicing this invention does not differ substantially from that disclosed by the prior art referred to above, and consists essentially of a suitable tank, or in the case of a continuous line, a suitable elongated linear tank or trough for holding the slip, a source of direct current, the interior of the tank generally being connected across said electrical source to render it cathodic, the suspending means for carrying the article to be enameled and/or the article to be enameled, being made the anode. The tank batch of ceramic slip is electrically conductive, and the finely milled slip particles are caused to migrate, under the applied electromotive force, toward the anodic article, or substrate to be enameled.

Following removal from the enamel slip, the coated article is then fired according to conventional enameling, or ceramic procedures.

Although the preferred embodiment of this invention involves the application of porcelain enamel directly to a base metal substrate, it is to be understood that the invention could have general applicability to non-metallic substrates, such as ceramic bodies, so long as they could be made sufficiently conductive, and this invention further contemplates that not only porcelain enamel frits, but ceramic frits, as well as cermets, may also be successfully deposited by electrophoresis.

As will be apparent, the composition of any frit useful to this invention is not critical, and set forth below is the oxide composition of a typical frit which may be applied by this invention, which may be batched and smelted using conventional, well-known frit raw materials, and conventional smelting procedures.

TABLE I

| Oxide | Wt. percent |
|---|---|
| $SiO_2$ | 37.04 |
| $ZrO_2$ | 8.37 |
| $K_2O$ | 1.67 |
| $Na_2O$ | 15.32 |
| $Li_2O$ | 0.95 |
| $CaO$ | 4.98 |
| $B_2O_3$ | 21.29 |
| $Al_2O_3$ | 3.42 |
| $P_2O_5$ | 1.03 |
| $Co_2O_3$ | 0.76 |
| $NiO$ | 1.03 |
| $CuO$ | 0.23 |
| $MnO_2$ | 1.10 |
| $F$ | 2.81 |
| | 100.00 |

The foregoing frit may then be milled to an aqueous slip in a conventional ball mill utilizing the following mill addition:

TABLE II

| | Parts by weight |
|---|---|
| Frit | 100 |
| Clay | 1 |
| Gum tragacanth | ½ |
| Bentonite | ½ |
| Water | 60 |

The above materials and water are milled to a fineness of 2 to 4 grams of frit retained on a 400 mesh screen per 50 cc. of slip. This slip is added to a suitable deposition tank, along with sufficient water, to produce a suspension bath of slip with a specific gravity of 1.30. At the 1.30 specific gravity constant agitation of the slip is required to prevent the solid particles of frit from settling to the bottom of the container. To the slip the following materials are added to complete the "tank batch"

Kasil #6 [1] _____ 775 ml./l. of bath
Sodium aluminate _____ 2325 ml./l. of bath

[1] Soluble potassium silicate, diluted with two or more parts of water before addition to the suspension bath.

The sodium aluminate is dissolved in hot water (150 grams/liter) prior to addition to the suspension bath. After allowing sufficient time for the Kasil #6 and the sodium aluminate to mix uniformly throughout the slip, the suspension bath is ready for electrodeposition onto a metal substrate.

Any metal can be coated by electrodeposition from this suspension bath if the metal surface is electrochemically active during deposition. By "electrochemically active" is meant that metal ions are going into solution during electrical current flow. Examples of metal surfaces which are electrochemically active in the suspension are (1) chemically cleaned copper and mild steel and (2) sandblasted or gritblasted cast iron and mild steel. Examples of metal surfaces which, untreated, are not regarded as generally electrochemically active in the suspension are stainless steel, aluminum, and heavily oxidized iron and steel.

A surface activating treatment for metal surfaces such as pickled and neutralized mild steel and lightly oxidized iron and steel which are not sufficiently electrochemically active is to expose, by immersion or spray, the surface to a solution (¼ to 25%) of a strong acid such as sulfuric, hydrochloric, nitric, or phosphoric for a few seconds.

For electrodeposition, direct electrical current is used, and the suspension bath closes the circuit between anode and cathode. The article being coated is made the anode of the electrical circuit while the cathode may be the interior surface of the tank, or separate sheets or plates of a conducting material such as stainless steel, mild steel, or copper. The voltage between the article being coated and the cathode is adjusted to a value such that the current density on the article being coated is in the range of 5 to 100 amperes per square foot, preferably between 15 to 60 amperes per square foot, with the ideal current density for porcelain enamels being 20 to 30 amperes per square foot.

The voltage required is generally in the range of 10 to 200 volts, with the exact voltage requirement depending upon the size of the cathode, the size of the article being coated, the distance between the cathode and the article being coated and the electrical resistivity of the suspension bath. For the suspension bath described above the electrical resistivity will be approximately 300 ohms centimeters.

Voltage required will depend on the separation of the article being enameled from the submerged electrode. For one inch separation the range of voltage is 2-50 volts. For eighteen inches of separation the range of voltage is 50-300 volts.

When the electrodeposition container is a mild steel tank 6 inchs wide, 8 inches long, and 18 inches deep, and the article being coated is a 4 inch square panel of 20 gauge enameling iron, the voltage required for the preferred current desity of 20 amperes per square foot will be approximately 25 volts. Obviously, the voltage may be veried to provide the ideal current density in slips of varying resistivity and to accommodate the other variables influencing electrodeposition.

The thickness of the deposited coating may be controlled by regulating the quantity of electricity per unit area passing through the suspension bath. Since the quantity of electricity per unit area is the product of the current density and the time during which the current flows, the thickness of deposited coating is controlled by both the current desnity and the deposition time. Times of deposition at a current density of 20 amperes per square foot have been found to vary from 5 to 50 seconds for a coating whose thickness after firing is three mils. A thicker, or thiner, coating requires a proportional increase, or decrease, in deposition time.

The reason for the variation in deposition time at the 20 amperes per square foot is that suspension baths with different frits, or different particle size distributions of the same glass frit, may have different electrical efficiencies. Electrical efficiencies have been found to vary from a maximum of 250 milligrams deposited material per coulomb of electricity to a minimum 25 milligrams deposited material per coulomb of electricity. Since approximately 25 grams of deposited material are needed per square foot for a three mil fired coating thickness, the deposition time at 20 amperes per square foot and an efficiency of 50 milligrams per coulomb, is 25 seconds.

The time for the article to be in the deposition bath with the electrical current on is in the range of 5 to 90 seconds. Actual required time is dependent on the electrical efficiency of the deposition bath, the average current density and the thickness of the enamel to be deposited.

After a coating has been deposited, the article is removed from the suspension bath. At this point the article may be rinsed with water (immersion or spray) to remove any loose particles of glass frit from the surface of the coating, and to prevent edge beading. After rinsing, the coating is dried. Drying may be done in a drying oven, with the use of infrared lamps, or other means. Firing of the electrodeposited coating is accomplished by conventional methods. For an article coated from the foregoing suspension bath, firing of the deposited coating would be from approximately three minutes at 1450° F. in a periodic furnace.

The quality of novelty of this invention resides in the discovery that the combination in the tank batch, of an alkali salt from the group represented by alkali silicate, alkali zirconate and alkali titanate, with an alkali luminate, promotes the self-limiting characteristic heretofore described whereby a uniform coating may be achieved on a relatively complex shape, such as a washer basket, stove part, etc.

Of the alkali aluminates, sodium aluminate is much to be preferred, with potassium and lithium aluminate following in that order.

And, while the alkali salts of silicates, zirconates and titanates function to promote the self-limiting quality of this invention, the alkali silicate salt is by far to be preferred, and the specific alkali silicate to be preferred is potassium silicate, with sodium and lithium silicate following in that order of preference.

For example, as much as 3½ times more of potassium or lithium aluminate would be required to provide the same results achieved with sodium aluminate.

And, while the alkali zirconates and titanates promoted the self-limiting quality, they were required in greater concentrations than the alkali silicates.

In Table III below, is set forth a typical mill addition for electro-deposition, along with a workable range of the various mill additions:

TABLE III

| | Parts by weight | |
|---|---|---|
| | Typical | Range |
| Glass frit(s) | 100 | Base 100. |
| Refractor [1] | 10 | 0-100.0. |
| Clay | 1 | ½-10.0. |
| Bentonite | ¾ | ⅛-2.0. |
| Gum tragacanth | ¾ | ¹⁄₁₆-2.0. |
| Water | 50 | 40-60.0. |

[1] Silica, alumina, zircon, feldspar, zinc oxide, color oxide, etc.

Resultant slip from above:
Specific gravity—1.5-1.9 (1.7 typical).
Fineness range—10 grams retained on 200 mesh screen per 50 cc. slip to 1 gram retained on 400 mesh screen per 50 cc. slip. Typical is 3 grams retained on 400 mesh screen per 50 cc. slip.

As is well known in enamel technology, there is a wide range of other, acceptable electrolytes, and mill agents which may be tolerated in the mill addition.

In Table IV below, is set forth the typical tank batch composition, which is achieved by adding water or salts to the milling in sufficient quantity to provide the required specific gravity and composition.

TABLE IV.—TANK BATCH SLIP COMPOSITION

|  | Parts by weight | |
| --- | --- | --- |
|  | Typical | Range |
| Glass Frit(s) | 100 | Base 100. |
| Refractory | 10 | 0–100.0. |
| Clay | 1 | ½–10.0. |
| Bentonite | ¾ | ⅛–2.0. |
| Gum tragacanth | ¾ | 1/16–2.0. |
| Water | 175 | 140–400.0. |
| Sodium aluminate | 0.52 | 0.10–2.0. |
| Kasil #6 | 0.17 | 0.03–1.0. |

Electrical resistivity of the bath should be in the range of 150 to 700 ohm centimeters. Typical bath will have electrical resistivity of 350 ohm centimeters. Electrical resistivity of the deposited self-limiting coating will be in the range $7 \times 10^2$ to $1 \times 10^7$ ohm centimeters.

It is to be understood that the alkali salt of aluminate, or the alkali silicate, zirconate or titanate, may be added in part to the mill and/or directly to the tank batch.

This invention also encompasses the electrodeposition of cermets, achieved by introducing into the tank batch slip, or by milling with the ceramic coating, such powdered metals as aluminum, which are co-deposited with the ceramic coating to form a cermet, or combination metal-ceramic coating.

Having thus described and illustrated my invention, it is set forth in the following claims which are to be construed in the light of the United States statutes and decisions in such a manner as to give them the broad range of equivalents to which they are entitled.

I claim:

1. In the method of electrophoretically depositing a self-limiting ceramic coating from a slip thereof, onto a multiplanar substrate, said slip containing 100 parts by weight of a ceramic frit, the improvement step of incorporating, uniformly dispersed throughout said slip, from about 0.10 to about 2.0 parts by weight of alkali metal aluminate, in combination with from about 0.03 to about 1.0 total part by weight of an alkali metal salt selected from the group consisting of alkali metal silicates, alkali metal zirconates and alakli metal titanates, to achieve a uniform, self-limiting electrophoretically deposited ceramic coating.

2. The method of claim 1 wherein the electrophoretic deposition is at a current density of 5 to 100 amperes per square foot.

3. The method of claim 1 wherein the electrophoretic deposition is at a current density of 15 to 60 amperes per square foot.

4. The method of claim 1 wherein the electrophoretic deposition is at a current density of 20 to 30 amperes per square foot.

5. In the method of electrophoretically depositing upon a multiplanar electrochemically active metal substrates a porcelain enamel coating from a slip thereof containing 100 parts by weight of an enamel frit, the improvement step of incorporating, uniformly dispersed throughout said slip, from about 0.10 to about 2.0 parts by weight of alkali metal aluminate, in combination with from about 0.03 to about 1.0 total part by weight of an alkali metal salt selected from the group consisting of alkali metal silicates, alkali metal zirconates and alkali metal titanates, to achieve a uniform, self-limiting electrophoretically deposited porcelain enamel coating.

6. The method of claim 5 wherein the electrophoretic deposition is at a current density of 5 to 100 amperes per square foot.

7. The method of claim 5 wherein the electrophoretic deposition is at a current density of 15 to 60 amperes per square foot.

8. The method of claim 5 wherein the electrophoretic deposition is at a current density of 20 to 30 amperes per square foot.

9. In the method of electrophoretically depositing a cermet coating from a slip thereof, onto a multiplanar substrate, said slip containing 100 parts by weight of dispersed cermet material, the improvement step of incorporating, uniformly dispersed throughout said slip, from about 0.10 to about 2.0 parts by weight of alkali metal aluminate, in combination with from about 0.03 to about 1.0 total part by weight of an alkali metal salt selected from the group consisting of alkali metal silicates, alkali metal zirconates, and alkali metal titanates, to achieve a uniform, self-limiting electrophoreticaly deposited cermet coating.

10. The method of claim 9 wherein the electrophoretic deposition is at a current density of 5 to 100 amperes per square foot.

11. The method of claim 9 wherein the electrophoretic deposition is at a current density of 15 to 60 amperes per square foot.

12. The method of claim 9 wherein the electrophoretic deposition is at a current density of 20 to 30 amperes per square foot.

13. In the method of electrophoretically depositing a ceramic coating from a slip thereof containing 100 parts by weight of a ceramic frit, the improvement step of incorporating, uniformly dispersed throughout said slip, from about 0.10 to about 2.0 parts by weight of sodium aluminate, in combination with from about 0.03 to about 1.0 total parts by weight potassium silicate, to achieve a uniform, self-limiting electrophoretically deposited ceramic coating.

14. The method of claim 13 wherein the electrophoretic deposition is at a current density of 5 to 100 amperes per square foot.

15. The method of claim 13 wherein the electrophoretic deposition is at a current density of 15 to 60 amperes per square foot.

16. The method of claim 13 wherein the electrophoretic deposition is at a current density of 20 to 30 amperes per square foot.

17. In the method of electrophoretically depositing a ceramic coating from a slip thereof, onto a multiplanar substrate, said slip containing 100 parts by weight of a ceramic frit, the improvement step of incorporating, uniformly dispersed throughout said slip, from about 0.10 to about 2.0 parts by weight of sodium aluminate, in combination with from about 0.03 to about 1.0 total parts by weight potassium silicate, to achieve a uniform, self-limiting electrophoretically deposited ceramic coating.

18. The method of claim 17 wherein the electrophoretic deposition is at a current density of 5 to 100 amperes per square foot.

19. The method of claim 17 wherein the electrophoretic deposition is at a current density of 15 to 60 amperes per square foot.

20. The method of claim 17 wherein the electrophoretic deposition is at a current density of 20 to 30 amperes per square foot.

References Cited

UNITED STATES PATENTS

| 2,215,144 | 9/1940 | Clayton et al. | 204—181X |
| 2,421,652 | 6/1947 | Robinson et al. | 204—181X |

FOREIGN PATENTS

| 505,709 | 5/1939 | Great Britain | 204—181 |

DANIEL E. WYMAN, Primary Examiner

W. J. SHINE, Assistant Examiner